United States Patent
Kono

(10) Patent No.: US 9,781,366 B2
(45) Date of Patent: Oct. 3, 2017

(54) IMAGE SENSING SYSTEM AND METHOD OF DRIVING THE SAME

(71) Applicant: CANON KABUSHIKI KAISHA, Tokyo (JP)

(72) Inventor: Shoji Kono, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/047,223

(22) Filed: Feb. 18, 2016

(65) Prior Publication Data

US 2016/0165161 A1 Jun. 9, 2016

Related U.S. Application Data

(63) Continuation of application No. 13/905,826, filed on May 30, 2013, now Pat. No. 9,300,879.

(30) Foreign Application Priority Data

Jun. 13, 2012 (JP) .................................. 2012-133732

(51) Int. Cl.
| | |
|---|---|
| *H04N 5/232* | (2006.01) |
| *G02B 27/64* | (2006.01) |
| *G03B 17/00* | (2006.01) |
| *H04N 5/369* | (2011.01) |
| *H04N 5/235* | (2006.01) |
| *H04N 5/345* | (2011.01) |

(52) U.S. Cl.
CPC ........... *H04N 5/3696* (2013.01); *H04N 5/235* (2013.01); *H04N 5/23245* (2013.01); *H04N 5/2351* (2013.01); *H04N 5/2354* (2013.01); *H04N 5/23212* (2013.01); *H04N 5/345* (2013.01)

(58) Field of Classification Search
CPC ............. H04N 5/23212; H04N 5/2254; H04N 5/2253; H04N 5/335
USPC ..... 348/345, 349, 352, 340, 311; 250/201.2, 250/201.4; 396/79–83, 89–152; 352/139, 352/140; 382/255
See application file for complete search history.

(56) References Cited

U.S. PATENT DOCUMENTS

| | | | |
|---|---|---|---|
| 2007/0025718 A1* | 2/2007 | Mori .................. | G03B 15/05 396/155 |
| 2008/0074534 A1* | 3/2008 | Kusaka .............. | H04N 5/23212 348/364 |
| 2009/0115887 A1* | 5/2009 | Sugimoto .......... | H04N 5/23212 348/349 |
| 2009/0140122 A1 | 6/2009 | Suzuki | |
| 2009/0231470 A1* | 9/2009 | Hitosuga ............ | H04N 5/23293 348/239 |

(Continued)

FOREIGN PATENT DOCUMENTS

| | | |
|---|---|---|
| CN | 1934853 A | 3/2007 |
| CN | 102196180 A | 9/2011 |

(Continued)

Primary Examiner — Xi Wang
(74) Attorney, Agent, or Firm — Canon USA, Inc., IP Division

(57) ABSTRACT

In a first operation mode, signals are read from pixels including ranging pixels in a pixel array and ranging and image generation are performed based on the read signals. In a second operation mode, signals are read from the pixels excluding the ranging pixels and exposure is controlled based on the read signals.

16 Claims, 7 Drawing Sheets

(56) References Cited

U.S. PATENT DOCUMENTS

| | | | | |
|---|---|---|---|---|
| 2011/0141334 A1* | 6/2011 | Kuriyama | ............... | G02B 7/36 |
| | | | | 348/333.11 |
| 2011/0267511 A1* | 11/2011 | Imafuji | ............... | H04N 5/3696 |
| | | | | 348/294 |
| 2011/0267533 A1* | 11/2011 | Hirose | ............... | H04N 5/23212 |
| | | | | 348/345 |
| 2012/0057046 A1* | 3/2012 | Tanaka | ............... | H04N 5/2357 |
| | | | | 348/229.1 |
| 2014/0368696 A1* | 12/2014 | Uchida | ............... | H04N 5/3651 |
| | | | | 348/234 |

FOREIGN PATENT DOCUMENTS

| | | |
|---|---|---|
| CN | 102318335 A | 1/2012 |
| JP | 2000-156823 A | 6/2000 |
| JP | 2010-219958 A | 9/2010 |
| JP | 2010-288083 A | 12/2010 |

* cited by examiner

FIG. 3
| ROW NUMBER | 1 | 2 | 3 | 4 | 5 | 6 |
|---|---|---|---|---|---|---|
| 1 | R | G | R | G | R | G |
| 2 | G | B | G | B | G | B |
| 3 | R | G | S1 | G | R | G |
| 4 | G | B | G | S2 | G | B |
| 5 | R | G | R | G | R | G |
| 6 | G | B | G | B | G | B |
| 7 | R | G | S1 | G | R | G |
| 8 | G | B | G | S2 | G | B |
| 9 | R | G | R | G | R | G |
| 10 | G | B | G | B | G | B |
| 11 | R | G | S1 | G | R | G |
| 12 | G | B | G | S2 | G | B |
| 13 | R | G | R | G | R | G |
| 14 | G | B | G | B | G | B |
COLUMN NUMBER
FIG. 4A
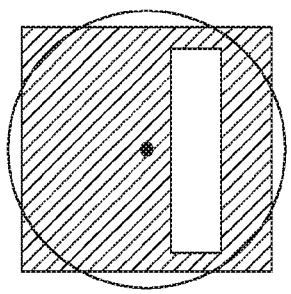
FIG. 4B
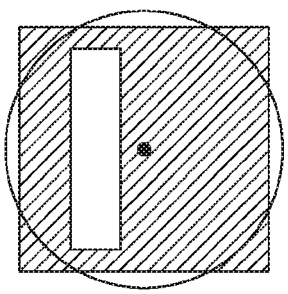
FIG. 4C
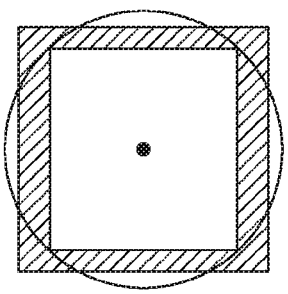

FIG. 8A
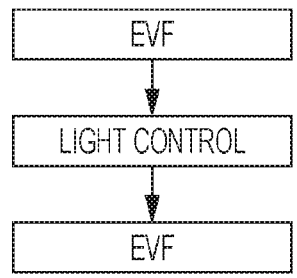
FIG. 8B
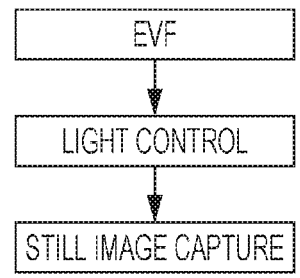
FIG. 9
| ROW NUMBER | 1 | 2 | 3 | 4 | 5 | 6 |
|---|---|---|---|---|---|---|
| 1 | R | G | R | G | R | G |
| 2 | G | B | G | B | G | B |
| 3 | R | G | S1 | G | R | G |
| 4 | G | B | G | B | G | B |
| 5 | R | G | R | G | R | G |
| 6 | G | B | G | S2 | G | B |
| 7 | R | G | R | G | R | G |
| 8 | G | B | G | B | G | B |
| 9 | R | G | S1 | G | R | G |
| 10 | G | B | G | B | G | B |
| 11 | R | G | R | G | R | G |
| 12 | G | B | G | S2 | G | B |
| 13 | R | G | R | G | R | G |
| 14 | G | B | G | B | G | B |
COLUMN NUMBER

FIG. 10

| ROW NUMBER | | | | | | |
|---|---|---|---|---|---|---|
| 1 | R | G | R | G | R | G |
| 2 | G | B | G | B | G | B |
| 3 | R | G | S1 | G | R | G |
| 4 | G | B | G | B | G | B |
| 5 | R | G | R | G | R | G |
| 6 | G | B | G | S2 | G | B |
| 7 | R | G | R | G | R | G |
| 8 | G | B | G | B | G | B |
| 9 | R | G | R | G | R | G |
| 10 | G | B | G | B | G | B |
| 11 | R | G | R | G | R | G |
| 12 | G | B | G | B | G | B |
| 13 | R | G | R | G | R | G |
| 14 | G | B | G | B | G | B |
| 15 | R | G | S1 | G | R | G |
| 16 | G | B | G | B | G | B |
| 17 | R | G | R | G | R | G |
| 18 | G | B | G | S2 | G | B |
| 19 | R | G | R | G | R | G |
| 20 | G | B | G | B | G | B |
| | 1 | 2 | 3 | 4 | 5 | 6 |

COLUMN NUMBER

IMAGE SENSING SYSTEM AND METHOD OF DRIVING THE SAME

CROSS-REFERENCE TO RELATED APPLICATION

This application is a Continuation of U.S. application Ser. No. 13/905,826, filed May 30, 2013, which claims priority from Japanese Patent Application No. 2012-133732 filed Jun. 13, 2012, which are hereby incorporated by reference herein in their entireties.

BACKGROUND OF THE INVENTION

Field of the Invention

The present invention relates to an image sensing system and a method of driving the image sensing system.

Description of the Related Art

Known image sensing systems, such as a digital camera and a camcorder, include an image sensing system that performs auto-focusing (AF) based on phase difference detection using sensors for image sensing.

Japanese Patent Laid-Open No. 2000-156823 discloses a solid-state image sensing apparatus configured such that a plurality of photoelectric conversion cells for obtaining ranging signals are arranged in some portions of a pixel array included in the apparatus. The photoelectric conversion cells include a pair of photoelectric conversion cells each having an opening which is offset relative to the center of the cell, the openings being offset in opposite directions away from each other.

As disclosed in Japanese Patent Laid-Open No. 2000-156823, the solid-state image sensing apparatus has a skipping mode and a ranging mode as operation modes. In the skipping mode, signals are read from the photoelectric conversion cells while the photoelectric conversion cells in the portions are skipped, since signals from the photoelectric conversion cells for ranging in the pixel array are not used for image generation. Movie or view finder image data is generated based on data obtained in the skipping mode. Skipping readout enables high-speed photometry. In the ranging mode, signals are read from lines including the photoelectric conversion cells for AF.

However, exposure control may not be properly performed during operation disclosed in Japanese Patent Laid-Open No. 2000-156823. To perform exposure control and image generation in the skipping mode, signals are read from the required number of photoelectric conversion cells for an image. Accordingly, the time required to obtain signals of one frame becomes longer. Under conditions that the quantity of light from an object considerably varies due to, for example, a strobe in a short time, the exposure control may not be able to follow the change of light quantity.

SUMMARY OF THE INVENTION

One aspect of the present invention provides an image sensing system including the following elements. A photoelectric conversion apparatus includes a pixel array including a plurality of pixels arranged in a matrix and a plurality of microlenses arranged in correspondence to the plurality of pixels, the plurality pixels including a plurality of image sensing pixels for image sensing and a plurality of ranging pixels for ranging. A signal processing unit is configured to process signals read from the photoelectric conversion apparatus. The ranging pixels include a first ranging pixel and a second ranging pixel. The first ranging pixel has an opening that is offset in a first direction relative to an optical center of the corresponding microlens. The second ranging pixel has an opening that is offset in a second direction opposite to the first direction. The image sensing system has a first operation mode and a second operation mode. In the first operation mode, signals are read from the ranging pixels and the image sensing pixels in the pixel array of the photoelectric conversion apparatus, ranging is performed based on the signals from the ranging pixels, and an image is generated based on the signals from the image sensing pixels. In the second operation mode, signals are read from the image sensing pixels and exposure is controlled based on the signals from the image sensing pixels.

Another aspect of the present invention provides a method of driving an image sensing system that includes a photoelectric conversion apparatus which includes a pixel array including a plurality of pixels arranged in a matrix and a plurality of microlenses arranged in correspondence to the plurality of pixels, the plurality of pixels including a plurality of image sensing pixels for image sensing and a plurality of ranging pixels for ranging, and further includes a signal processing unit configured to process signals read from the photoelectric conversion apparatus and a display unit configured to display an image based on the signals processed by the signal processing unit. The ranging pixels include a first ranging pixel and a second ranging pixel. The first ranging pixel has an opening that is offset in a first direction relative to an optical center of the corresponding microlens. The second ranging pixel has an opening that is offset in a second direction opposite to the first direction. The method includes performing a first operation to read signals from the pixels including the ranging pixels in the pixel array in order to perform ranging and image display based on the read signals, and performing a second operation to read signals from the pixels excluding the ranging pixels in order to control exposure.

Further features of the present invention will become apparent from the following description of exemplary embodiments with reference to the attached drawings.

BRIEF DESCRIPTION OF THE DRAWINGS

FIG. 3 is a diagram illustrating a pixel arrangement of a pixel array according to the first embodiment.

FIGS. 4A to 4C are top views illustrating configurations of AF pixels and an image sensing pixel in the embodiments of the present invention.

FIGS. 8A and 8B are diagrams illustrating operations according to the first embodiment.

FIG. 9 is a diagram illustrating a pixel arrangement of a pixel array according to a second embodiment.

FIG. 10 is a diagram illustrating a pixel arrangement of a pixel array according to a third embodiment.

DESCRIPTION OF THE EMBODIMENTS

First Embodiment

A first embodiment according to the present invention will be described with reference to the drawings.

Figure 1:
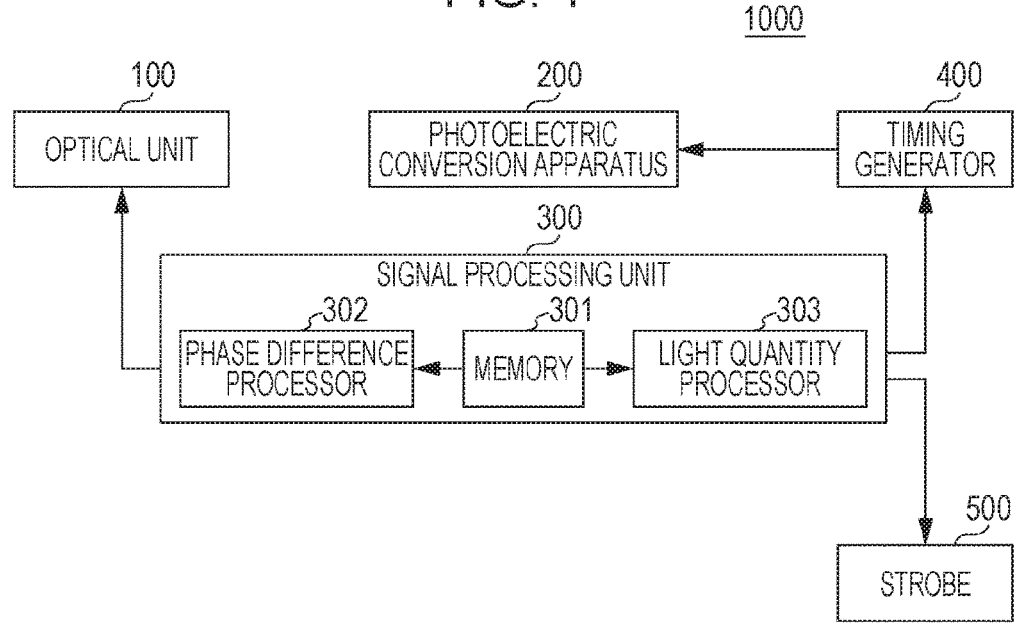
FIG. 1 is a block diagram of an image sensing system according to embodiments of the present invention.

FIG. 1 is a block diagram illustrating an exemplary configuration of an image sensing system. An image sensing system 1000 includes an optical unit 100, a photoelectric conversion apparatus 200, a signal processing unit 300, a timing generator 400, and a light source 500.

Light from an object passes through the optical unit 100 and is focused on the photoelectric conversion apparatus 200. The focused light is photoelectrically converted into electrical signals by the photoelectric conversion apparatus 200. The photoelectric conversion apparatus 200 includes image sensing pixels for image generation and AF pixels (ranging pixels).

The signals read from the photoelectric conversion apparatus 200 are transferred to the signal processing unit 300 in which the signals are stored as data in a memory 301. A phase difference processor 302 performs phase difference calculation based on data obtained from the AF pixels of the data stored in the memory 301 to determine an out-of-focus amount (defocus amount). The signal processing unit 300 controls the optical unit 100 based on the determined defocus amount to perform AF control.

Furthermore, in the signal processing unit 300, a light quantity processor 303 determines an exposure amount based on data obtained from the image sensing pixels for image generation of the data stored in the memory 301. The signal processing unit 300 controls the timing generator 400 and the light source 500 based on the determined exposure amount. Thus, the timing generator 400 supplies a driving signal to the photoelectric conversion apparatus 200 to change charging time and the quantity of light emitted from the light source 500 is changed. The light source 500 is, for example, a strobe.

Although not illustrated herein, the image sensing system 1000 further includes an interface configured to transfer data stored in the memory 301 to an external device and a display (display unit) configured to display an image.

Figure 2:
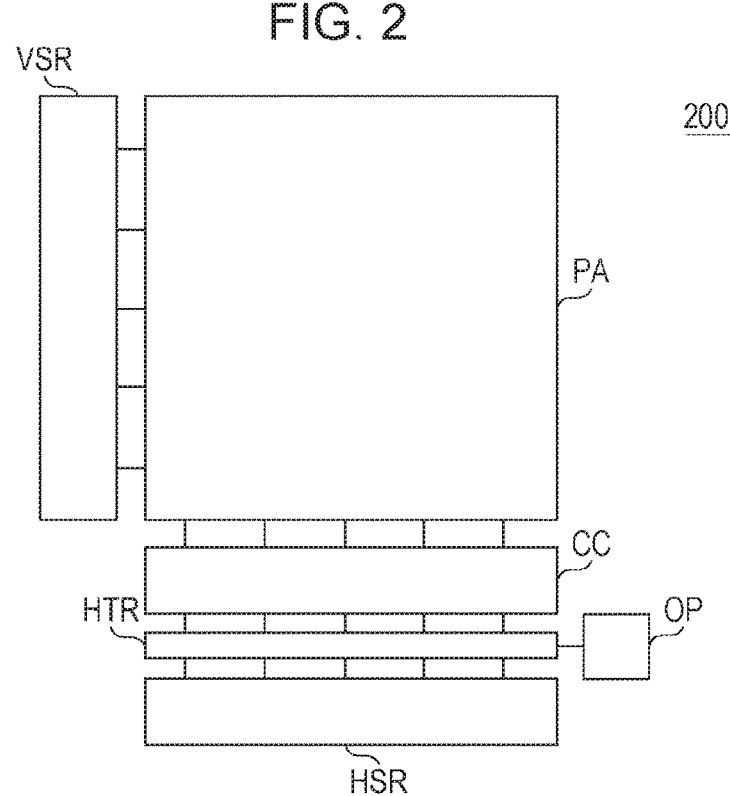
FIG. 2 is a block diagram illustrating a configuration of a photoelectric conversion apparatus according to the first embodiment.

FIG. 2 is a block diagram illustrating a configuration of the photoelectric conversion apparatus 200 included in the image sensing system 1000. The photoelectric conversion apparatus 200 includes a pixel array PA, a column reading portion CC, a horizontal transfer portion HTR, an output portion OP, a row selection portion VSR, and a column selection portion HSR.

The pixel array PA includes a plurality of pixels arranged in a matrix of rows and columns. Each of the pixels includes a photoelectric conversion element and generates charge in response to incident light passing through the optical unit 100. When the row selection portion VSR selects a plurality of pixels on a row-by-row basis, signals are output from the pixels in the selected row. Each of the pixels includes the photoelectric conversion element, an amplifying transistor configured to output a voltage signal based on the amount of generated charge, a reset transistor configured to reset the amount of charge stored in the photoelectric conversion element, and a selection transistor configured to select the pixel.

The column reading portion CC includes a plurality of column reading circuits arranged in correspondence to the columns of the pixel array PA. Each of the column reading circuits is configured to process signals output from the pixels in the corresponding column and may include a noise reduction circuit, such as a correlated double sampling (CDS) circuit, an amplifier, and a sample and hold circuit. The column reading circuit may include an analog-to-digital (AD) converter.

The column selection portion HSR selectively transfers the signals from the column reading circuits through the horizontal transfer portion HTR to the output portion OP. The horizontal transfer portion HTR includes a line to transfer an analog signal and a digital bus to transfer a digital signal and may include a plurality of buffer circuits connected in series to transfer a signal.

The output portion OP transfers signals supplied through the horizontal transfer portion HTR to a circuit subsequent to the image sensing system 1000. The output portion OP may include an amplifier and a circuit that enables differential output in the low voltage differential signaling (LVDS) format.

FIG. 3 is a diagram illustrating an exemplary pixel arrangement of the pixel array PA. In FIG. 3, an area of 14 rows by 6 columns in the pixel array PA is extracted and illustrated. Referring to FIG. 3, colors of color filters arranged in correspondence to the respective pixels are denoted by reference symbols R, G, and B: R means "red", G means "green", and B means "blue". The R, G, and B pixels are arranged in Bayer pattern such that each unit consists of four pixels of two rows by two columns. Some of the pixels are replaced with pixels S1 and S2. In the following description, the pixels S1 and S2 will be referred to as "AF pixels".

FIGS. 4A and 4B are top views of the AF pixels S1 and S2.

FIG. 4A illustrates the AF pixel S1 which includes a light-shielding portion that covers the photoelectric conversion element of the AF pixel S1 and has an opening. Referring to FIG. 4A, a hatched area corresponds to the light-shielding portion that shades the photoelectric conversion element from light and a blank area corresponds to the opening through which light enters the photoelectric conversion element. A circle denotes a projection of a microlens provided for the AF pixel S1 and a point denotes the optical center of the microlens. In the AF pixel S1, the opening is disposed in a position offset from the optical center of the microlens to the right in FIG. 4A. The light-shielding portion may comprise a single layer or multiple layers of a light-shielding member. The light-shielding member constituting the light-shielding portion may be a line to transmit a power supply voltage or a signal.

FIG. 4B illustrates the AF pixel S2 which includes a light-shielding portion that covers the photoelectric conversion element of the AF pixel S2 and has an opening. In the AF pixel S2, the opening is disposed in a different position from the opening in the AF pixel S1 of FIG. 4A. Whereas the opening of the AF pixel S1 is offset from the optical center of the microlens to the right, the opening of the AF pixel S2 is disposed in a position offset from the optical center of the microlens to the left. The AF pixel S1, serving as a first ranging pixel, has the opening that is offset in a first direction and the AF pixel S2, serving as a second ranging pixel, has the opening that is offset in a second direction. In other words, the AF pixels S1 and S2 have the openings offset in opposite directions relative to the optical center of the microlens. Although the opening is to the right or left of the optical center of the microlens in FIGS. 4A and 4B, for example, the opening may partly extend to the left beyond the optical center of the microlens in FIG. 4A. In this case, the accuracy of ranging is lower than the case where the opening is only to the right of the optical center. Considering the accuracy of ranging, the opening may be disposed on only one side relative to the optical center.

FIG. 4C illustrates the R, G, or B pixel (hereinafter, referred to as an "image sensing pixel") other than the AF pixels for comparison. The image sensing pixel has an opening that is not offset relative to the optical center of the microlens.

The principle of phase difference detection using the AF pixels S1 and S2 will be described below.

Figure 5:
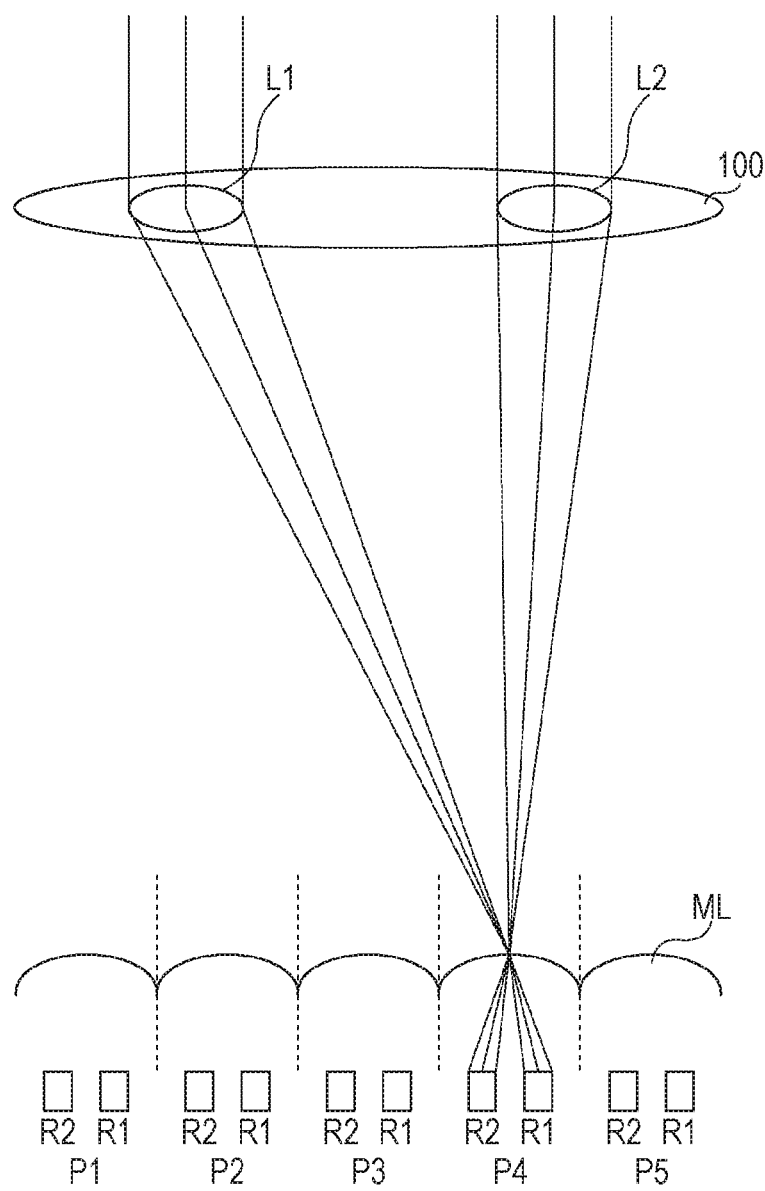
FIG. 5 is a diagram for explaining a principle of phase difference detection.

FIG. 5 illustrates a state in which an object image is focused on the photoelectric conversion apparatus 200. Microlenses ML are arranged in correspondence to pixels P1 to P5. A region R1 and a region R2 are regions of the photoelectric conversion element included in each of the pixels and correspond to the openings illustrated in FIGS. 4A and 4B. Since each AF pixel is shaded from light such that the light is incident only on the position offset from the optical center of the microlens ML, the photoelectric conversion element does not have to be separated into the regions R1 and R2. The photoelectric conversion element may have an integrated form or may be disposed in only one of the regions R1 and R2.

The following description will focus on the pixel P4 of the pixels P1 to P5 arranged successively. A light beam L1 incident on the region R1 of the pixel P4 passes through a corresponding pupil of the optical unit 100. Similarly, a light beam L2 incident on the region R2 of the pixel P4 passes through a corresponding pupil of the optical unit 100. If an object is in focus, the light beams L1 and L2 are converged on one point on the surface of the microlens ML. The light beams L1 and L2 then enter the regions R1 and R2 of the photoelectric conversion element, respectively. Since the same images are formed in the regions R1 and R2, signals obtained from these regions have the same level.

Figure 6:
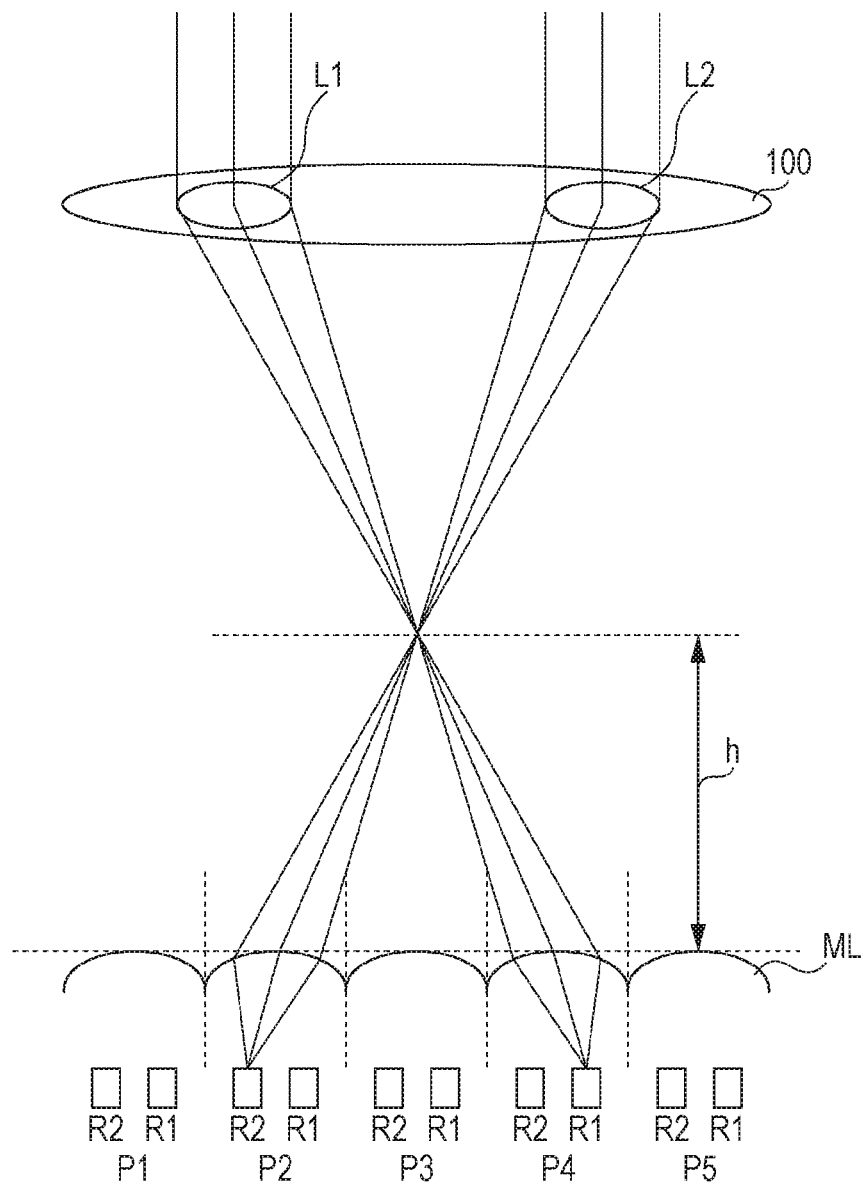
FIG. 6 is a diagram for explaining the principle of phase difference detection.

A case where an object is out of focus will be described with reference to FIG. 6. In the case where the object is out of focus, the light beams L1 and L2 are not converged on the microlens ML of a single pixel. The light beams L1 and L2 intersect at a position different from the surface of the microlens ML. Accordingly, the light beam L1 enters the pixel P4 and the light beam L2 enters the pixel P2 in the case of FIG. 6. Consequently, signals obtained from the regions R1 and R2 of the pixel P4 have different levels. The distance, denoted by h, between a plane tangent to the surface of the microlens ML and the position at which the light beams L1 and L2 intersect will be referred to as a "defocus amount".

Comparison between signals obtained from the pixel S1 and those obtained from the pixel S2 in FIG. 3 using the above-described principle enables a determination as to whether an object is in focus. If the signal processing unit 300 determines that the object is out of focus, the signal processing unit 300 controls the optical unit 100 by moving the optical unit 100 or changing a focal point. The signal processing unit 300 repeats determination and optical unit control until the object is in focus.

An operation sequence of the image sensing system 1000 according to this embodiment will be described with reference to FIG. 7.

First, the signal processing unit 300 supplies a control signal to the timing generator 400 so that the timing generator 400 operates in a skipping mode which is a first operation mode (S1).

In step S2, signals of one frame are read out in the skipping mode. Specifically, the photoelectric conversion apparatus 200 reads signals from some pixels of the pixel array. In this operation mode, signals are read from the pixels in the rows including the AF pixels in addition to the rows including the image sensing pixels. The signal processing unit 300 generates an image based on the signals obtained from the rows including the image sensing pixels. For example, by displaying the generated image on the display of the image sensing system 1000, the display may serve as an electronic view finder (EVF). In addition, the image can be recorded as a movie in the memory 301. Since the signals are read from only some of the pixels in the pixel array, the time required to read signals of one frame can be reduced. Accordingly, a movie smoother than a movie based on signals read from all of the pixels can be obtained. Furthermore, since signals from the AF pixels do not contribute to image generation, a process of correcting the difference in characteristics between the image sensing pixels and the AF pixels can be eliminated. In step S2, phase difference ranging is performed based on the signals obtained from the AF pixels.

Subsequently, whether an event has occurred is determined in step S3. Examples of events include a pre-flash switch for the strobe 500, serving as the light source, being turned-on by a user and a shutter switch being turned-on by the user. If it is determined in step S3 that no event has occurred, the operation returns to step S2 and signals of one frame are again read out in the skipping mode.

If it is determined in step S3 that the pre-flash switch for the strobe 500 has been turned on, the operation proceeds to step S4. If it is determined in step S3 that the shutter switch has been turned on, the operation proceeds to step S7.

In step S4, the timing generator 400 is switched from the skipping mode to a light control mode which is a second operation mode. In this operation mode, signals are read from the rows including no AF pixels, and signals are not read from the rows including the AF pixels. Accordingly, the process of correcting the difference in characteristics between the AF pixels and the image sensing pixels can be eliminated. Furthermore, since skipping readout is performed, the number of target pixels from which signals are read can be less than that in the skipping mode. As the number of target pixels is smaller, the time required to obtain signals of one frame can be shorter. In the light control mode in which no image is generated, the proper amount of exposure can be obtained in the use of a light source, such as a strobe, whose light quantity considerably varies in a short time.

In step S5, the strobe light quantity suitable for image sensing conditions is determined based on the signals read in step S4. Upon determination of the strobe light quantity, the operation returns to step S1 and the timing generator 400 is set to the skipping mode.

If it is determined in step S3 that the shutter switch has been turned on, the timing generator 400 is switched from the skipping mode to the light control mode (step S7).

In step S8, the strobe light quantity suitable for image sensing conditions is determined based on signals obtained in the light control mode in a manner similar to step S5.

In step S9, the timing generator 400 is switched from the light control mode to a still image shooting mode which is a third operation mode. The still image shooting mode is an operation mode to read signals from the image sensing pixels and the AF pixels without skipping the pixels.

In step S10, the strobe 500 is allowed to emit light on light emission conditions determined in step S9 and shooting is performed. Upon shooting, the operation again returns to step S1.

Figure 7:
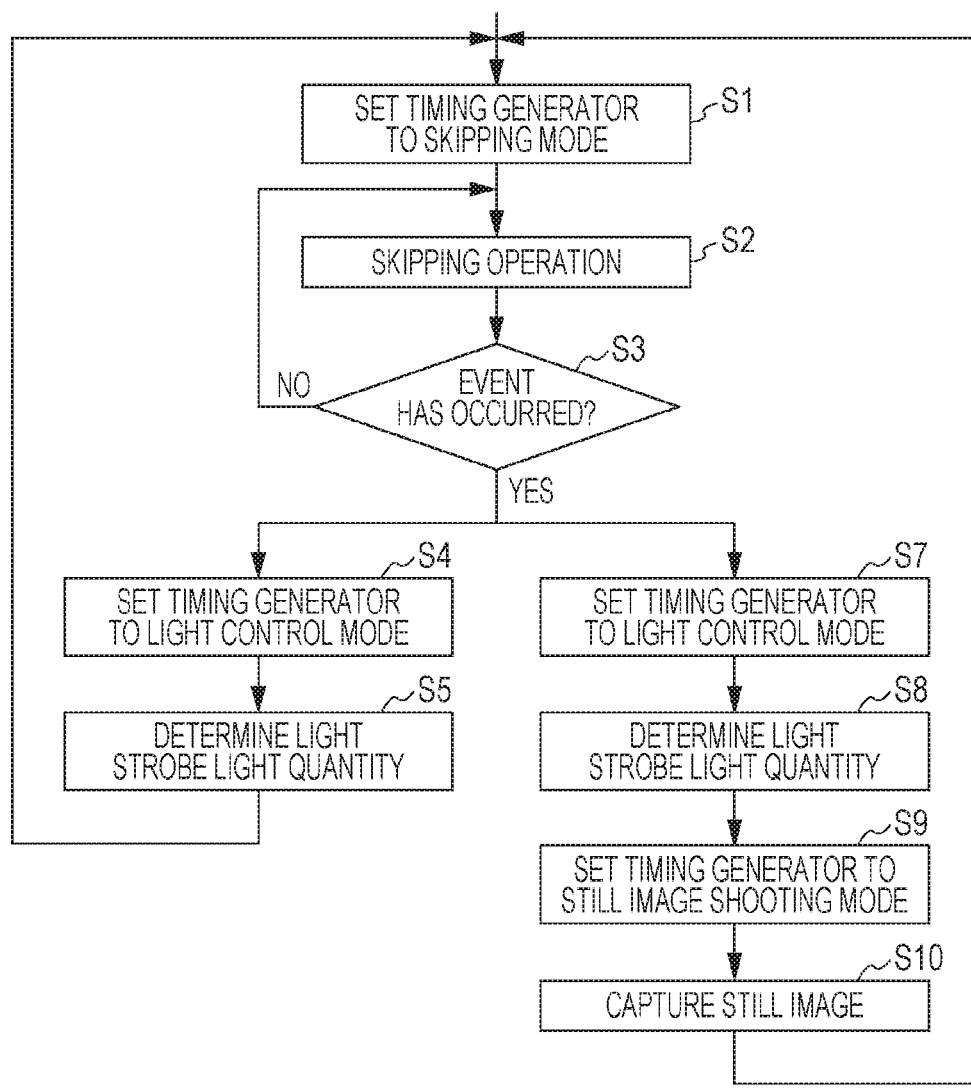
FIG. 7 is a flowchart of an operation sequence of the image sensing system according to the first embodiment.

In the skipping mode in FIG. 7, an image obtained from the image sensing pixels is displayed on the display (EVF). In the light control mode, light control is performed (light control).

FIG. 8A is a diagram explaining a flow of image sensing frames obtained in the case where turn-on of the pre-flash switch for the strobe 500 is determined in step S3 in FIG. 7.

In step S2, EVF display is performed based on signals obtained from the image sensing pixels in the skipping mode. Specifically, the EVF display is performed and AF is performed based on signals obtained from the AF pixels.

When the turn-on of the pre-flash switch for the strobe 500 is determined in step S3, the mode is switched to the light control mode. The strobe light quantity is determined based on signals read from the image sensing pixels excluding the skipped pixels.

Upon determination of the strobe light quantity, the mode is again switched to the skipping mode. Accordingly, EVF display is performed. After that, the EVF display is repeated until the occurrence of another event is determined in step S3.

FIG. 8B is a diagram explaining a flow of image sensing frames obtained in the case where turn-on of the shutter switch is determined in step S3 in FIG. 7.

In step S2, EVF display is performed based on signals obtained from the image sensing pixels in the skipping mode. Specifically, the EVF display is performed and AF is performed based on signals obtained from the AF pixels.

When the turn-on of the shutter switch is determined in step S3, the mode is switched to the light control mode. The strobe light quantity is determined based on signals read from the image sensing pixels excluding the skipped pixels.

Upon determination of the strobe light quantity, signals are read from the image sensing pixels and the AF pixels to capture a still image (still image capture). After that, the mode is again switched to the skipping mode, so that EVF display is performed. The EVF display is repeated until the occurrence of another event is determined in step S3.

According to this embodiment, signals are read from the rows including only the image sensing pixels and the rows including the AF pixels in the skipping mode. In the light control mode, signals are read from the rows including no AF pixels. Consequently, exposure can be controlled based on signals obtained for a frame which is not related to image generation. Thus, proper exposure control can be immediately achieved on condition that the quantity of light, such as strobe light, considerably varies in a short time.

In the technique disclosed in Japanese Patent Laid-Open No. 2000-156823, EVF display is performed based on signals obtained in the skipping mode and exposure control is also performed based on these signals. In such a method, the exposure control may not be able to follow the change of light quantity as described above. If successive image frames include a frame out of focus, this frame is hardly visible. If successive image frames include a frame having different brightness from the other frames, the difference is easy to notice. According to this embodiment, the image sensing system 1000 has the skipping mode in which phase difference detection and image generation are performed based on signals read from the AF pixels and those from the image sensing pixels and the light control mode in which the amount of exposure is controlled based on signals read only from the image sensing pixels. Advantageously, a natural image can be generated while an object is being in focus.

Second Embodiment

A second embodiment according to the present invention will be described with reference to the drawings. The second embodiment will be described mainly with respect to the difference from the first embodiment.

FIG. 9 is an area of 14 rows by 6 columns extracted from the pixel array PA. In FIG. 9, the notation for pixels is the same as that in FIG. 3. The arrangement of AF pixels in FIG. 9 differs from that in FIG. 3.

In the first embodiment, the AF pixels S1 and S2 are arranged next to each other diagonally in the matrix. Two rows are arranged between the two rows including the diagonally adjacent AF pixels S1 and S2 and the next two rows including the diagonally adjacent AF pixels S1 and S2. In the present embodiment, the AF pixels S1 and S2 are arranged such that two rows are arranged between each row including the AF pixel S1 and each row including the AF pixel S2.

As compared with the arrangement in the first embodiment, the number of AF pixels in the area of the same size can be reduced. The rows including the AF pixels are skipped in the skipping mode. Accordingly, as the number of AF pixels is smaller, the resolution of an image obtained in the skipping mode is higher.

Since a light beam from an object partly enters the photoelectric conversion element of the AF pixel as described above, signals obtained from the AF pixel are not used for image generation. Interpolation is performed based on signals obtained from pixels surrounding the AF pixel. As the number of AF pixels to be subjected to interpolation is larger, processing time necessary for interpolation is longer. This embodiment offers the same advantages as those in the first embodiment and further offers advantages in that since the number of AF pixels per unit area is smaller than that in the first embodiment, a higher definition image can be generated and higher-speed readout can be achieved.

Third Embodiment

A third embodiment according to the present invention will be described with reference to the drawings. The third embodiment will be described mainly with respect to the difference from the second embodiment.

FIG. 10 illustrates an area of 20 rows by 6 columns extracted from the pixel array PA. In FIG. 10, the pixel notation is the same as those in FIGS. 3 and 9. The number of AF pixels per unit area is smaller than that in the arrangement in FIG. 9.

In the third embodiment, the AF pixels S1 and S2 are arranged such that eight rows are arranged between a row group and the next row group, each of the row groups including a first row including the AF pixel S1, a second row including the AF pixel S2, and two rows arranged between the first and second rows.

According to this embodiment, a higher definition image than the second embodiment can be generated and higher-speed readout than the second embodiment can be achieved.

It should be understood that the above-described embodiments are merely illustrative examples of implementation of the present invention and the technical scope of the present invention is not to be interpreted as limiting. Specifically, the present invention can be embodied in various forms without departing from the technical spirit or essential features of the invention. For example, although the arrangements in which the AF pixels S1 are arranged on one column and the AF pixels S2 are arranged on another column are illustrated, the present invention is not limited to the above examples. For example, the AF pixels S1 may be arranged in one row and the AF pixels S2 may be arranged in another row.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system comprising:
   a photoelectric conversion apparatus that includes a pixel array including a plurality of pixels arranged in a matrix including rows and columns, the plurality of pixels including a plurality of image sensing pixels for image sensing and a plurality of ranging pixels for ranging; and
   a signal processing unit configured to process signals read from the photoelectric conversion apparatus,
   wherein signals are read from the pixel array in each of a first frame, a second frame, and a third frame,
   wherein the system is capable of performing a first operation, a second operation, and a third operation,
   the first operation being an operation that signals are read from the ranging pixels and the image sensing pixels in the first frame, the signal processing unit performs ranging based on the signals from the ranging pixels of the first frame, and the signal processing unit generates an image which is based on the signals from the image sensing pixels of the first frame,
   the second operation being an operation that signals are read from the image sensing pixels without reading signals from the ranging pixels in the second frame, and exposure is controlled based on the signals from the image sensing pixels of the second frame,
   the third operation being an operation that signals are read from the image sensing pixels in the third frame, and generating an image based on the signals from the image sensing pixels of the third frame,
   wherein the system performs the third operation, under an image sensing condition based on a result of the ranging of the first operation and controlling exposure of the second operation, and
   wherein a number of signals output from the photoelectric conversion apparatus in the first operation is larger than a number of signals output from the photoelectric conversion apparatus in the second operation, and smaller than a number of the imaging pixels read out in the third operation.

2. The system according to claim 1, further comprising a strobe,
   wherein the system performs the first operation in a period in which the strobe is in an OFF state, and
   wherein the system performs the second operation in a period in which the strobe is in an ON state, and
   wherein the system performs the third operation in a period in which the strobe is in an ON state.

3. The system according to claim 2,
   wherein the ranging pixels include a first ranging pixel and a second ranging pixel,
   wherein the first ranging pixel has an opening that is offset in a first direction relative to an optical center of a microlens arranged corresponding to the first ranging pixel, and
   wherein the second ranging pixel has an opening that is offset in a second direction opposite to the first direction, relative to an optical center of a microlens arranged corresponding to the second ranging pixel.

4. The system according to claim 2, further comprising an electronic view finder,
   wherein the system displays the image generated by the signal processing unit on the electronic view finder, and
   wherein the system performs a light control of the strobe using the signals read out in the second operation.

5. The system according to claim 2, further comprising a display configured to display an image generated based on signals read from the photoelectric conversion apparatus.

6. The system according to claim 1,
   wherein the ranging pixels include a first ranging pixel and a second ranging pixel,
   wherein the first ranging pixel has an opening that is offset in a first direction relative to an optical center of a microlens arranged corresponding to the first ranging pixel, and
   wherein the second ranging pixel has an opening that is offset in a second direction opposite to the first direction, relative to an optical center of a microlens arranged corresponding to the second ranging pixel.

7. The system according to claim 1, further comprising a display configured to display an image generated based on signals read from the photoelectric conversion apparatus.

8. The system according to claim 1, further comprising a shutter switch,
   wherein the system performs the first operation in a period in which the shutter switch is in an OFF state,
   wherein the system performs the second operation in a period in which the shutter switch is in an ON state, and
   wherein the system performs the third operation in a period in which the shutter switch is in an ON state.

9. A method of driving a system that includes a photoelectric conversion apparatus, the photoelectric conversion apparatus including a pixel array that includes a plurality of pixels arranged in a matrix, the plurality of pixels including a plurality of image sensing pixels for image sensing and a plurality of ranging pixels for ranging, the method comprising:
   performing a first operation, including reading signals from the ranging pixels and the image sensing pixels in a first frame, performing ranging based on the signals from the ranging pixels;
   performing a second operation, including reading signals from the image sensing pixels without reading signals from the ranging pixels, and controlling exposure based on the signals from the image sensing pixels;
   performing a third operation, under an image sensing condition based on a result of the ranging of the first operation and controlling exposure of the second operation, including reading signals from the image sensing pixels, and generating an image based on the signals from the image sensing pixels, a number of signals output from the photoelectric conversion apparatus in the first operation being larger than a number of signals output from the photoelectric conversion apparatus in the second operation, and smaller than a number of the imaging pixels read out in the third operation.

10. The method according to claim 9, wherein the system further comprises a strobe, and
    the method comprises:
    performing the first operation in a period in which the strobe is in an OFF state,
    performing the second operation in a period in which the strobe is in an ON state, and
    performing the third operation in a period in which the strobe is in an ON state.

11. The method according to claim 10,
    wherein the ranging pixels include a first ranging pixel and a second ranging pixel, wherein the first ranging pixel has an opening that is offset in a first direction relative to an optical center of a microlens arranged corresponding to the first ranging pixel, and wherein the second ranging pixel has an opening that is offset in a second direction opposite to the first direction, relative to an optical center of a microlens arranged corresponding to the second ranging pixel.

12. The method according to claim 10, wherein the system further comprises an electronic view finder, wherein the system displays the image generated by the signal processing unit on the electronic view finder, and wherein the system performs a light control of the strobe using the signals read out in the second operation.

13. The method according to claim 10, the system further comprising a display, and the method further comprising:
displaying on the display an image generated based on the signals from the image sensing pixels.

14. The method according to claim 9, wherein the ranging pixels include a first ranging pixel and a second ranging pixel, wherein the first ranging pixel has an opening that is offset in a first direction relative to an optical center of a microlens arranged corresponding to the first ranging pixel, and wherein the second ranging pixel has an opening that is offset in a second direction opposite to the first direction, relative to an optical center of a microlens arranged corresponding to the second ranging pixel.

15. The method according to claim 9, the system further comprising a display, and the method further comprising:
displaying on the display an image generated based on the signals from the image sensing pixels.

16. The method according to claim 9, wherein the system further comprises a shutter switch, and the method comprises:
performing the first operation in a period in which the shutter switch is in an OFF state,
performing the second operation in a period in which the shutter switch is in an ON state, and
performing the third operation in a period in which the shutter switch is in an ON state.

* * * * *